United States Patent [19]

Wiedmann

[11] 3,815,106

[45] June 4, 1974

[54] FLIP-FLOP MEMORY CELL ARRANGEMENT

[76] Inventor: Siegfried Kurt Wiedmann, em Himmel 64A, 7 Stuttgart, Germany

[22] Filed: May 11, 1972

[21] Appl. No.: 252,433

[52] U.S. Cl. ....... 340/173 FF, 307/291, 340/173 R, 340/173 CP

[51] Int. Cl. ... G11c 7/00, G11c 11/40, H03k 3/286

[58] Field of Search .... 340/173 FF, 173 CP, 173 R; 307/238, 291

[56] References Cited

UNITED STATES PATENTS

| | | | |
|---|---|---|---|
| 3,427,598 | 2/1969 | Kubinec | 340/173 FF |
| 3,643,231 | 2/1972 | Lohrey | 340/173 FF |
| 3,643,235 | 2/1972 | Berger | 340/173 FF |

*Primary Examiner*—Bernard Konick
*Assistant Examiner*—Stuart N. Hecker
*Attorney, Agent, or Firm*—Martin G. Reiffin; George O. Saile

[57] ABSTRACT

A memory cell arrangement allows the powering of only two row cells at any one time. This results in lower power dissipation in the cells and also permits the driving circuits to operate at a much lower power level, thereby further reducing the power dissipation per chip.

15 Claims, 5 Drawing Figures

FLIP-FLOP MEMORY CELL ARRANGEMENT

BACKGROUND OF THE INVENTION

1. Field of the Invention

This invention relates to monolithic bipolar memories for use in digital computers and other digital data processing equipment. Such memories comprise a plurality of arrays of memory cells each adapted to store a single binary digit or bit of information. Any selected cell of the array may be accessed at random and a bit of information may be written into or read out of the selected cell.

2. Description of the Prior Art

The present invention is an improvement over the prior art monolithic memory disclosed in U.S. Pat. No. 3,643,235, issued Feb. 15, 1972 and assigned to the assignee of the present invention. The improvements over this prior art memory are as follows:

In the prior memory, an entire row of cells is powered up during a read or write operation, whereas in the present invention only two cells are powered up at any one time. This results in lower power dissipation in the cells and also permits the driving circuits to operate at a much lower power level, thereby further reducing the power dissipation per chip. This in turn permits a lower cost cooling system for a given bit density. For example, the difference in power dissipation over the prior art may permit less expensive air cooling instead of liquid cooling for a given bit density. The lower power required also results in lower cost, in that smaller lines and less expensive power supplies may be employed.

The present memory provides a faster write performance than that of the prior art memory disclosed in said patent. This is achieved by the inverse operation of the PNP addressing transistors which permit current to be fed into the base of one of the switching transistors. As shown in FIG. 8 of said prior patent, the NPN addressing transistors T3, T4 can only draw current away from the switching transistors T1, T2 and cannot feed current into the bases thereof to accelerate the write operation.

The memory in accordance with the present invention requires fewer metal-to-semiconductor contacts. This provides higher reliability because the latter is proportional to the number of such contacts in that most failures occur at an interface between the metal and the semiconductor.

The present invention requires fewer metal lines than required by said prior art memory. This provides higher reliability in that there is less trouble due to electromigration, and also provides a higher bit-per-chip density by about 40 percent as compared with said prior art memory, thereby achieving greater economy.

The present invention permits a single layer of metallization as compared with the double layer required in said prior memory. Crossing metal lines are thereby avoided. This permits the present memory to be manufactured with fewer processing steps, thereby achieving lower cost. The single layer metallization also provides a higher yield during manufacture.

The present invention requires fewer N+ diffused areas as compared with said prior art memory. As shown in FIGS. 9*a*, 9*b* of said patent, there are four N+ areas per cell as compared with only two N+ areas per cell in the present invention. This results in fewer defects known as "pipes" extending from the N+ areas to the respective subcollectors.

SUMMARY OF THE INVENTION

It is a primary object of the present invention to provide a novel memory having a high storage density, a low power dissipation and a high speed of operation.

Another object is to provide a memory which powers up only two cells of an array row instead of the entire row of cells, thereby reducing the power dissipation and driving power required so as to lessen the cost of cooling systems and power supplies.

A further object is to provide a novel memory cell wherein complementary addressing transistors operate in the inverse mode during the write operation so as to feed current into the base of one of the switching transistors and thereby achieve a faster write operation.

Still another object is to provide a monlithic memory having relatively fewer metal-to-semiconductor contacts so as to reduce the occurrence of failures and thereby achieve higher reliability.

Another object is to provide a monolithic memory having fewer metal lines, thereby providing higher reliability due to reduced difficulty from electromigration, and also permitting higher circuit and information density so as to provide greater economy.

Still another object is to provide a monolithic memory having a single layer of metallization, thereby permitting fewer processing steps and providing a higher yield, so as to result in lower cost of manufacture.

A further object is to provide a monolithic memory cell having only two N+ diffused areas, thereby resulting in fewer pipe defects extending from these areas to the subcollector.

Other objects and advantages of the present invention are inherent in the structure disclosed in the specification and drawings or will be apparent to those skilled in the art as the detailed description proceeds.

The disclosed embodiment comprises an array of memory cells arranged in two horizontal rows and four vertical columns, although in actual practice memories in accordance with the present invention will have many more rows and columns. A first vertical address line is connected to and actuable to select the cells of the first and second columns, and a second vertical address line is connected to and actuable to select the cells of the third and fourth columns. A first horizontal address line is connected to and actuable to select the cells of the first row, and a second horizontal address line is connected to and actuable to select the cells of the second row. A first pair of bit lines is connected to the first column of cells for writing information into and reading information out of a selected cell of said first column; a second pair of bit lines is connected to the second and third columns of cells for writing into and reading out of a selected cell of the second and third columns; and a third pair of bit lines is connected to the fourth column of cells for writing into and reading out of a selected cell of the fourth column.

The disclosed memory cell comprises a first pair of NPN switching transistors each having an emitter connected to the respective horizontal address line and a base connected to the collector of the other switching transistor to provide a bistable circuit, a pair of PNP addressing transistors each having an emitter connected to the base of a respective switching transistor and a collector connected to a respective one of the bit lines, and a pair of PNP load transistors each having an emitter connected to the respective vertical address line, a base connected to the respective horizontal address line, and a collector connected to the collector of the respective switching transistor.

DESCRIPTION OF THE PREFERRED EMBODIMENT

1. Memory Cell Equivalent Circuit

Figure 1:
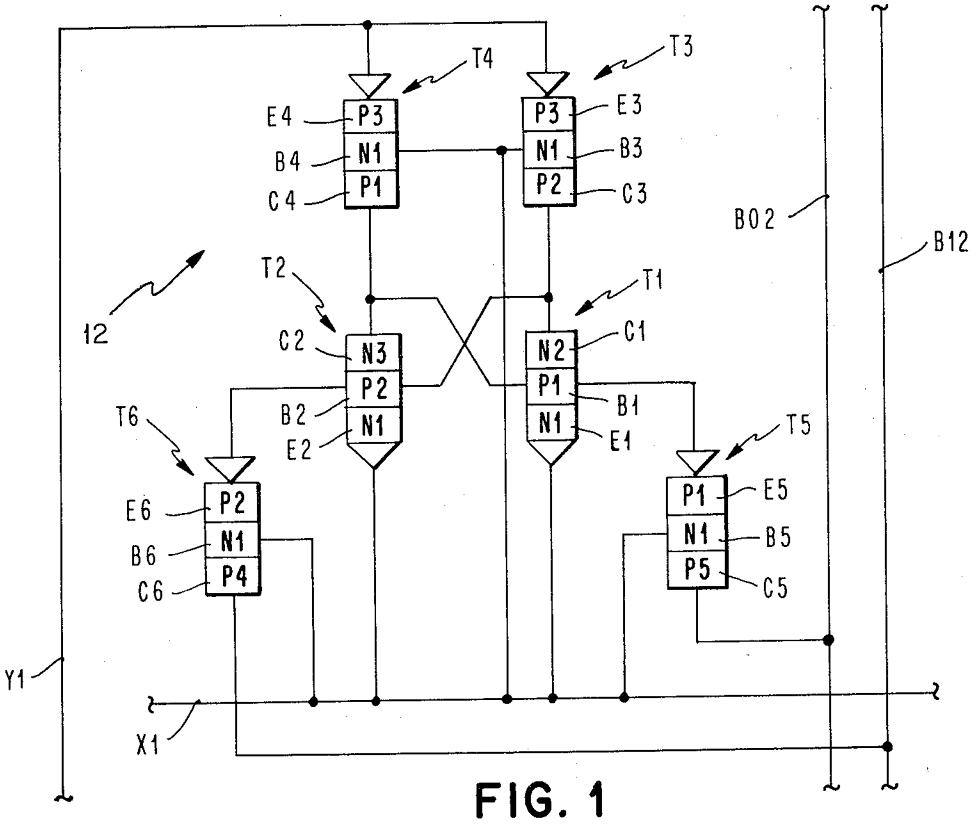
FIG. 1 is an equivalent circuit of a memory cell in accordance with the present invention.
Figure 3:
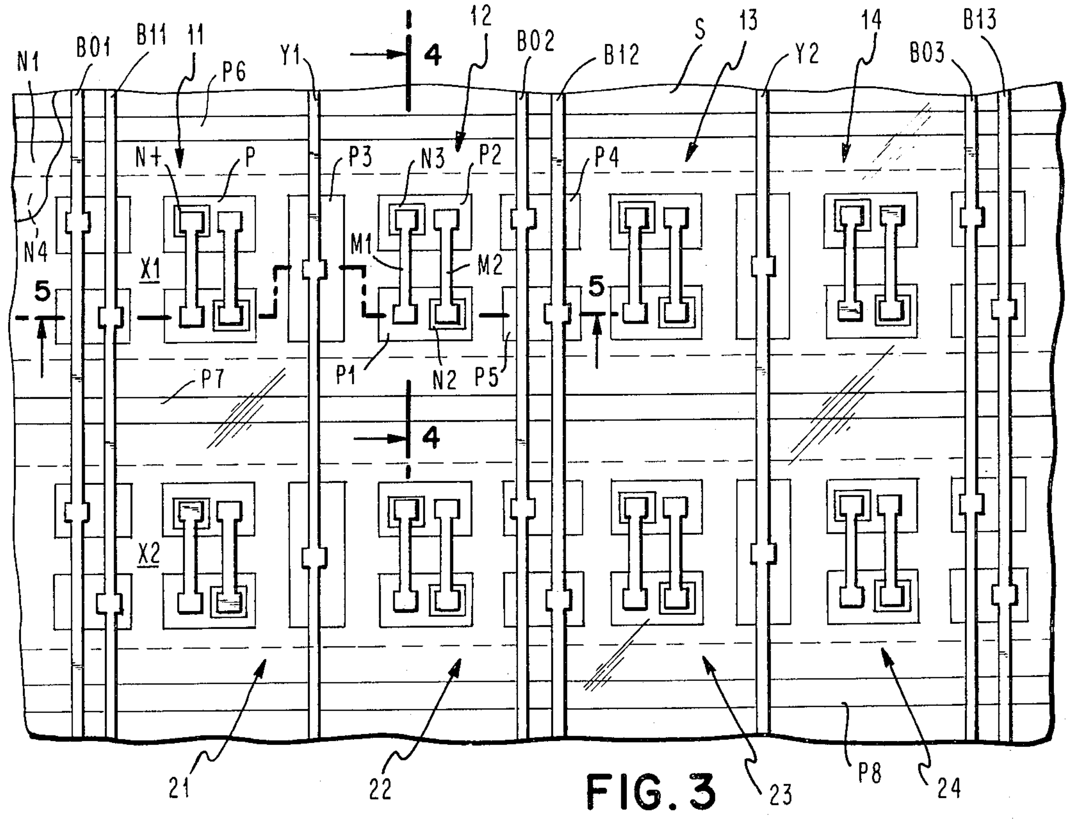
FIG. 3 is a plan view of the physical structure of a monolithic memory in accordance with the present invention and showing two rows and four columns of cells of the array.
Figure 4:
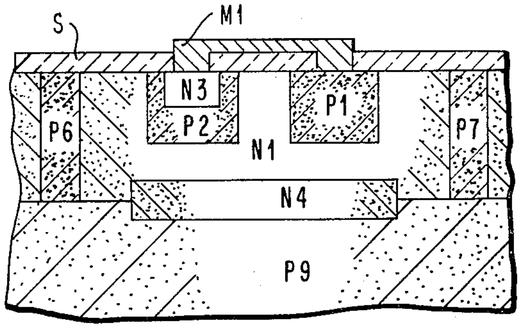
FIG. 4 is a sectional view taken substantially on line 4—4 of FIG. 3.
Figure 5:
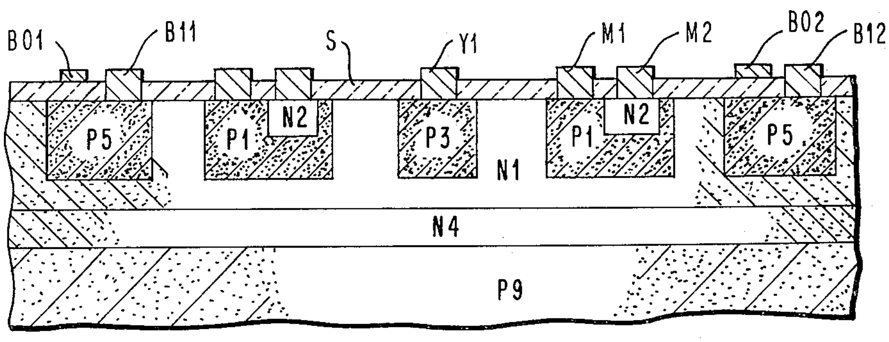
FIG. 5 is a sectional view taken substantially on line 5—5 of FIG. 3.

Referring first to FIG. 1, there is shown an equivalent circuit of a single memory cell indicated generally by the reference numeral 12. The physical construction of the memory cells is shown in FIGS. 3 to 5 and will be described in detail below.

The equivalent circuit in FIG. 1 comprises a pair of switching transistors T1, T2, a pair of load transistors T3, T4, and a pair of addressing transistors T5, T6. The collector C1 of transistor T1 is connected to the base B2 of transistor T2, and the collector C2 of transistor T2 is similarly connected to the base B1 of transistor T1, thereby providing a cross-coupled bistable circuit. The emitters E1, E2 of transistors T1, T2 are connected to a horizontal address line X1.

The collector C3 of load transistor T3 is connected to the collector C1 of switching transistor T1, and the collector C4 of load transistor T4 is connected to the collector C2 of switching transistor T2. The bases B3, B4 of load transistors T3, T4 are connected to horizontal address line X1. The emitters E3, E4 of load transistors T3, T4 are connected to a vertical address line Y1.

The emitter E5 of addressing transistor T5 is connected to the base B1 of switching transistor T1, and the emitter E6 of addressing transistor T6 is connected to the base B2 of switching transistor T2. The bases B5, B6 of addressing transistors T5, T6 are connected to horizontal address line X1. The collector C5 of addressing transistor T5 is connected to a bit line B02 and the collector C6 of addressing transistor T6 is connected to a second bit line B12.

The emitters, bases and collectors of transistors T1 to T6 are designated in FIG. 1 with the letter "P" or "N" followed by a numeral to indicate a respective P-type or N-type semiconductor region constituting same, as will be described below with respect to FIGS. 3 to 5.

2. Array Schematic

Figure 2:
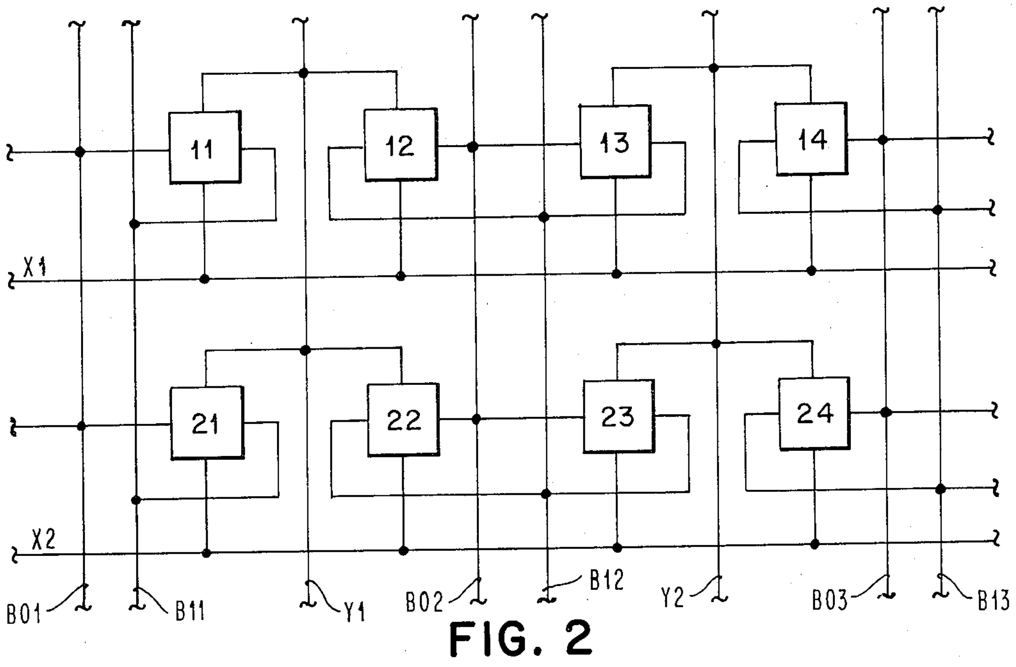
FIG. 2 is a schematic diagram showing two rows and four columns of memory cells, and the bit lines and address lines connected thereto.

Referring now to FIG. 2, there is shown an array of memory cells and the connection thereto of the respective address lines and bit lines. The array comprises a first row of cells 11, 12, 13, 14 and a second row of cells 21, 22, 23, 24 in vertical alignment with the first row to form four columns. It will be understood that in actual practice the array in accordance with the present invention will generally comprise many more rows and columns of cells which are not shown in the drawing for simplicity in illustration and clarity of description.

A first horizontal address line X1 is connected to the first row of cells 11, 12, 13, 14 and a second horizontal address line X2 is connected to the second row of cells 21, 22, 23, 24. A respective horizontal address line is connected to each of the other rows not shown. A first vertical address line Y1 is connected to the first column of cells 11, 21, and also to the second column of cells 12, 22. A second vertical address line Y2 is connected to the third column of cells 13, 23 and also to the fourth column of cells 14, 24. A first pair of bit lines B01, B11 are connected to the first column of cells 11, 21; a second pair of bit lines B02, B12 are connected to the second column of cells 12, 22 and also to the third column of cells 13, 23; and a third pair of bit lines B03, B13 are connected to the fourth column of cells 14, 24.

It will be understood that the first pair of bit lines B01, B11 are also connected to the column of cells, if any, immediately to the left of the first column of cells 11, 21, and that the third pair of bit lines B03, B13 are also connected to the column of cells, if any, immediately to the right of the fourth column of cells, 14, 24. It will be further understood that the address lines and bit lines are connected to the cells in the manner disclosed in the equivalent circuit of FIG. 1 and also more particularly disclosed in FIGS. 3 to 5 to be described in detail below.

3. Read Operation

The operation of reading the information stored in a cell will now be described with reference to cell 12. The potential of horizontal address line X1 is decreased by a few hundred milivolts and the potential of vertical address line Y1 is raised by a similar amount. The potential of the other vertical address line Y2 remains at its lower unselected level. Assuming that switching transistor T1 is conductive and that switching transistor T2 is cut off, the collector C2 of transistor T2 is at a relatively high potential level. Therefore, the base B1 of switching transistor T1 and the emitter E5 of addressing transistor T5 are at a relatively high potential level to cause current to flow through transistor T5 and hence through bit line B02. A conventional sense amplifier (not shown) connected to bit line B02 senses the current flow in the latter and thereby indicates that switching transistor T1 is conductive. If switching transistor T2 is conductive, this state of the cell is sensed in a similar manner by current flowing in the other bit line B12. There will be no current injected into bit lines B02, B12 from cells 13, 22, 23 or any other cell connected to the same bit line pair B02, B12 because these other cells are not supplied with current by their respective horizontal and vertical address lines.

4. Write Operation

The write operation will now be described with reference to memory cell 12. The potential of horizontal address line X1 is decreased by a few hundred millivolts. The potential of vertical address line Y2 is raised a similar amount to supply a current thereto, whereas the potential of vertical address line Y1 is maintained at its lower level. In order to write a logical "1" in cell 12, that is, to render transistor T2 conductive and transistor T1 cut off, the potential of bit line B12 is raised a few hundred millivolts to supply a current thereto. This causes addressing transistor T6 to operate inversely, that is, its collector C6 functions as an emitter and its emitter E6 functions as a collector. The current supplied by bit line B12 is thereby injected through addressing transistor T6 into the base B2 of switching transistor T2 to render the latter conductive. Although bit line B12 is also connected to cell 13, the latter is not affected because a sufficiently large cell current is supplied to cell 13 through vertical address line Y2 so that the additional bit line current supplied through bit line B12 does not switch cell 13. If it is desired to write a logical "0" in cell 12, then current is supplied in a similar manner to bit line B02 through inversely-operating addressing transistor T5 to render switching transistor T1 conductive and switching transistor T2 cut off.

5. Physical Structure

Referring now to FIGS. 3 to 5, there is shown the physical structure for realizing the array of memory cells shown only schematically in FIG. 2. Only the cell 12 of the first row and second column will be described in detail. The other cells are either identical to cell 12 or a mirror image thereof.

A first P-type diffused region P1 serves as base B1 of transistor T1, collector C4 of transistor T4 and emitter E5 of transistor T5. Above region P1 as viewed in FIG. 3 and in spaced adjacent relation thereto is a second P-type region P2 which serves as base B2 of transistor T2, collector C3 of transistor T3 and emitter E6 of transistor T6. To the left of regions P1, P2 as viewed in FIG. 3 is a third P-type diffused region P3 which serves as emitter E3 of transistor T3 and emitter E4 of transistor T4. To the right of region P2 as viewed in FIG. 3 is a fourth P-type region P4 which serves as collector C6 of transistor T6. To the right of region P1 as viewed in FIG. 3 is a fifth P-type region P5 which serves as collector C5 of transistor T5.

Region P3 is shared by the adjacent cell 11 and regions P4, P5 are shared by the adjacent cell 13. Cells 11 and 13 are mirror images of cell 12.

Regions P1, P2, P3, P4, P5 are diffused within an N-type region N1 which is preferably formed by epitaxial deposition. Region N1 serves as emitter E1 of transistor T1, emitter E2 of transistor T2, base B3 of transistor T3, base B4 of transistor T4, base B5 of transistor T5 and base B6 of transistor T6. A second N-type region N2 is formed by diffusion within region P1 and serves as collector C1 of transistor T1. A third N-type region N3 is formed by diffusion within region P2 and serves as collector C2 of transistor T2.

Region N1 is common to the first row of cells 11, 12, 13, 14 and is formed on the upper surface of the substrate which is of P-type material P9. The first row of cells 11, 12, 13, 14 is isolated from the row of cells thereabove (not shown) by a longitudinal horizontally extending P-type diffusion region P6. A diffused P-type isolation region P7 similarly isolates the first row of cells 11, 12, 13, 14 from the second row of cells 21, 22, 23, 24 and the latter are isolated from the row of cells therebelow (not shown) by a P-type diffused isolation region P8. An N+ type diffused region N4 of higher conductivity than region N1 extends longitudinally beneath each row of cells. A first metal lead M1 connects region P1 to region N3, and a second metal lead M2 connects region P2 to region N2.

Regions N1 and N4 constitute the respective horizontal address line such as at X1 and X2. Vertical address lines Y1, Y2 are metal leads extending over a silicon dioxide insulating layer S and are each connected to the regions P3 of a respective pair of columns of cells. Bit lines B01, B11, B02, B12, B03, B13 extend over silicon diode layer S. One bit line of the respective pair, for example bit line B02, is connected to region P4, and the other bit line of the pair, for example bit line B12, is connected to region P5.

It is to be understood that the specific embodiment shown in the drawing and described above is merely illustrative of one of the many forms which the invention may take in practice and that numerous modifications and variations thereof will readily occur to those skilled in the art without departing from the scope of the invention as delineated in the appended claims which are to be construed as broadly as permitted by the prior art.

I claim:

1. A memory cell comprising
- an address line,
- a pair of bit lines,
- a pair of load impedances,
- a pair of switching transistors each having:
  - an emitter connected to said address line,
  - a collector connected to a respective one of said load impedances, and
  - a base connected to the collector of the other transistor; and
- a pair of addressing transistors each having:
  - an emitter connected to the base of a respective switching transistor, and
  - a collector connected to a respective one of said bit lines.

2. A memory cell as set forth in claim 1 and comprising
- a second address line,
- said load impedances comprising a pair of load transistors each having:
  - an emitter connected to said second address line, and
  - a collector connected to the collector of a respective transistor of said switching pair.

3. A memory comprising
- an array of memory cells arranged in at least two horizontal rows and at least four vertical columns,
- a first vertical address line connected to and actuable to select the cells of the first and second columns,
- a second vertical address line connected to and actuable to select the cells of the third and fourth columns,
- a first horizontal address line connected to and actuable to select the cells of the first row,
- a second horizontal address line connected to and actuable to select the cells of the second row,
- a first pair of bit lines connected to the first column of cells for writing information into and reading information out of a selected cell of said first column,
- a second pair of bit lines connected to the second and third columns of cells for writing information into and reading information out of a selected cell of said second and third columns,
- a third pair of bit lines connected to the fourth column of cells for writing information into and reading information out of a selected cell of said fourth column wherein each of said memory cells comprises
a pair of load impedances,
a pair of switching transistors of a first conductivity type and each having:
an emitter connected to the respective horizontal address line,
a collector connected to a respective one of said load impedances, and
a base connected to the collector of the other transistor; and
a pair of addressing transistors of a second conductivity type opposite to said first conductivity type and each having:
an emitter connected to the base of a respective switching transistor,
a collector connected to a respective one of the respective pair of bit lines, and
a base connected to the respective horizontal address line.

4. A memory as set forth in claim 3 wherein
said pair of impedances comprises a pair of load transistors of said second conductivity type and each having:
an emitter connected to the respective vertical address line,
a base connected to the respective horizontal address line, and
a collector connected to the collector of a respective switching transistor.

5. A memory comprising
an array of memory cells arranged in at least two horizontal rows and at least four vertical columns,
a first vertical address line connected to and actuable to select the cells of the first and second columns,
a second vertical address line connected to and actuable to select the cells of the third and fourth columns,
a first horizontal address line connected to and actuable to select the cells of the first row,
a second horizontal address line connected to and actuable to select the cells of the second row,
a first pair of bit lines connected to the first column of cells for writing information into and reading information out of a selected cell of said first column,
a second pair of bit lines connected to the second and third columns of cells for writing information into and reading information out of a selected cell of said second and third columns,
a third pair of bit lines connected to the fourth column of cells for writing information into and reading information out of a selected cell of said fourth column
wherein each of said memory cells comprises
a pair of load impedances,
a first pair of transistors each having:
an emitter connected to the respective horizontal address line,
a collector connected to a respective one of said load impedances, and
a base connected to the collector of the other transistor; and
a second pair of transistors each having:
an emitter connected to the base of a respective transistor of said first pair, and
a collector connected to a respective one of the respective pair of bit lines.

6. A memory as set forth in claim 5 wherein
said pair of load impedances comprises a third pair of
transistors each having:
an emitter connected to the respective vertical address line, and
a collector connected to the collector of a respective transistor of said first pair.

7. A memory cell comprising
an address line,
a pair of bit lines,
a pair of load impedances,
a pair of switching transistors of a first conductivity type and each having:
an emitter connected to said address line,
a collector connected to a respective one of said load impedances, and
a base connected to the collector of the other transistor; and
a pair of addressing transistors of a second conductivity type opposite to said first conductivity type and each having:
an emitter connected to the base of a respective switching transistor,
a collector connected to a respective one of said bit lines, and
a base connected to said address line.

8. A memory cell as set forth in claim 7 and comprising
a second address line,
said load impedances comprising a pair of load transistors of said second conductivity type and each having:
an emitter connected to said second address line,
a base connected to said first-recited address line, and
a collector connected to the collector of a respective switching transistor.

9. A memory cell as set forth in claim 7 and comprising
a first semiconductor region N1 of one conductivity type and constituting the emitters E1, E2 of said switching transistors T1, T2 and the bases B5, B6 of said addressing transistors T5, T6,
a second semiconductor region P1 of an opposite conductivity type and within said first region N1 and constituting the base B1 of one T1 of said switching transistors and also constituting the emitter E5 of the respective addressing transistor T5 connected thereto, and
a third semiconductor region P2 of said opposite conductivity type and within said first region N1 and constituting the base B2 of the other T2 of said switching transistors and also constituting the emitter E6 of the respective addressing transistor T6 connected thereto.

10. A memory cell as set forth in claim 9 and comprising
a fourth semiconductor region N2 of said one conductivity type and within said second region P1 and constituting the collector C1 of said one switching transistor T1, and
a fifth semiconductor region N3 of said one conductivity type and within said third region P2 and constituting the collector C2 of said other switching transistor T2.

11. A memory cell as set forth in claim 10 and comprising a sixth semiconductor region P5 of said opposite conductivity type and within said first region N1 and constituting the collector C5 of said first-recited respective addressing transistor T5, and a seventh semiconductor region P4 of said opposite conductivity type and within said first region N1 and constituting the collector C6 of said second-recited respective addressing transistor T6.

12. A memory cell as set forth in claim 7 and comprising a first semiconductor region N1 of one conductivity type and constituting the emitters E1, E2 of said switching transistors T1, T2 and the bases B5, B6 of said addressing transistors T5, T6, a second semiconductor region P1 of the opposite conductivity type and within said first region N1 and constituting the base B1 of one T1 of said switching transistors and also constituting the emitters E5 of the respective addressing transistor T5 connected thereto, and a third semiconductor region P2 of the opposite conductivity type and within said first region N1 and constituting the base B2 of the other T2 of said switching transistors and also constituting the emitter E6 of the respective addressing transistor T6 connected thereto, said first semiconductor region N1 also constituting the bases B3, B4 of said load transistors T3, T4, said second semiconductor region p1 also constituting the collector C4 of one T4 of said load transistors, and said third semicondcutor region P2 also constituting the collector C3 of the other T3 of said load transistors.

13. A memory cell as set forth in claim 12 and comprising a fourth semiconductor region N2 of said one conductivity type and within said second region P1 and constituting the collector C1 of said one switching transistor, and a fifth semiconductor region N3 of said one conductivity type and within said third region P2 and constituting the collector C2 of said other switching transistor.

14. A memory cell as set forth in claim 13 and comprising a sixth semiconductor region P5 of said opposite conductivity type and within said first region N1 and constituting the collector C5 of said first-recited respective addressing transistor T5, and a seventh semiconductor region P4 of said opposite conductivity type and within said first region N1 and constituting the collector C6 of said second-recited respective addressing transistor T6.

15. A memory cell as set forth in claim 14 and comprising an eighth semiconductor region P3 of said opposite conductivity type and within said first region N1 and constituting the emitters E3, E4 of said load transistors T3, T4.

* * * * *